(12) United States Patent
Ferris et al.

(10) Patent No.: US 6,244,025 B1
(45) Date of Patent: Jun. 12, 2001

(54) LOAD COMPENSATION ADJUSTMENT IN LAWNMOWER HAVING INDEPENDENT SUSPENSION

(75) Inventors: David Ferris; William Shea; Henry Nordberg, all of Oneida, NY (US)

(73) Assignee: Ferris Industries, Inc., Munnsville, NY (US)

( * ) Notice: Subject to any disclaimer, the term of this patent is extended or adjusted under 35 U.S.C. 154(b) by 0 days.

(21) Appl. No.: 09/384,534

(22) Filed: Aug. 27, 1999

Related U.S. Application Data

(63) Continuation-in-part of application No. 09/359,537, filed on Jul. 22, 1999, which is a continuation-in-part of application No. 09/144,499, filed on Aug. 31, 1998, now Pat. No. 5,946,893, and a continuation-in-part of application No. 09/119,818, filed on Jul. 21, 1998, and a continuation-in-part of application No. 08/898,801, filed on Jul. 23, 1997.
(60) Provisional application No. 60/063,362, filed on Oct. 28, 1997, provisional application No. 60/053,403, filed on Jul. 22, 1997, and provisional application No. 60/022,865, filed on Jul. 26, 1996.

(51) Int. Cl.[7] .......................... A01D 34/03; A01D 34/43; A01D 34/64
(52) U.S. Cl. ........................................ 56/15.8; 56/DIG. 3
(58) Field of Search .................... 56/15 B, 15.7, 56/15.8, DIG. 22, DIG. 3, DIG. 10; 280/124.129, 124.136, 124.141

(56) References Cited

U.S. PATENT DOCUMENTS

| | | | |
|---|---|---|---|
| 3,024,041 | * | 3/1962 | Maruhn ........................ 280/124.109 |
| 3,940,161 | * | 2/1976 | Allison ............................ 280/96.2 R |
| 4,159,128 | * | 6/1979 | Blaine ................................. 280/772 |
| 4,957,307 | * | 9/1990 | Gandiglio ............................ 280/666 |
| 5,197,755 | * | 3/1993 | Quick ................................... 280/690 |
| 5,355,664 | * | 10/1994 | Zenner ................................. 56/15.8 |
| 5,367,864 | * | 11/1994 | Ogasawara et al. .................. 56/15.8 |
| 5,433,066 | * | 7/1995 | Wenzel et al. ........................ 56/14.7 |
| 5,865,020 | * | 2/1999 | Busboom et al. .................. 56/320.1 |
| 6,062,333 | * | 2/2000 | Gordon ............................... 180/311 |

\* cited by examiner

Primary Examiner—Robert E. Pezzuto
Assistant Examiner—Arpád Fáb Kovács
(74) Attorney, Agent, or Firm—Michael Best & Friedrich LLP

(57) ABSTRACT

A lawn mower includes a front wheel suspension system as well as a rear wheel suspension system. A load compensation adjuster is employed as part of the rear wheel suspension system that compensates for riders having significantly differing weights, as well as for weight changes occurring during the mowing operation, such as from grass clippings accumulating in a grass catcher bag.

23 Claims, 12 Drawing Sheets

LOAD COMPENSATION ADJUSTMENT IN LAWNMOWER HAVING INDEPENDENT SUSPENSION

REFERENCE TO RELATED APPLICATIONS

This is a continuation-in-part patent application of (1) copending U.S. patent application Ser. No. 09/359,537 filed on Jul. 22, 1999 which in turn is a continuation-in-part patent application of (i) copending U.S. patent application Ser. No. 09/144,499, filed Aug. 31, 1998, which in turn claims benefit from Provisional Patent Application Ser. No. 60/063,362 filed on Oct. 28, 1997; (ii) copending U.S. patent application Ser. No. 09/119,818 filed on Jul. 21, 1998, which in turn claims benefit from Provisional Patent Application Ser. No. 60/053,403 filed on Jul. 22, 1997 and Provisional Patent Application Ser. No. 60/063,362, filed on Oct. 28, 1997; and (iii) U.S. patent application Ser. No. 08/898,801, filed on Jul. 23, 1997, which in turn claims benefit from Provisional Patent Application Ser. No. 60/022,865 filed on Jul. 26, 1996; and (2) copending U.S. patent application Ser. No. 09/119,818, filed on Jul. 21, 1998, which in turn claims benefit from Provisional Patent Application Ser. No. 60/053, 403 filed on Jul. 22, 1997 and Provisional Patent Application Ser. No. 60/063,362, filed on Oct. 28, 1997, all of which are incorporated herein by reference.

FIELD OF THE INVENTION

The invention pertains to the field of lawnmowers. More particularly, the invention pertains to lawnmowers of the riding type having rear wheel independent suspension.

BACKGROUND OF THE INVENTION

The present invention is described with respect to its use on riding lawn mowers, particularly self-propelled machines fitted with rotating blades for cutting turf grasses. In the most favored typical design, the rider sits atop a three or four wheeled machine, while one or more blades rotate about a vertical axis within a mower deck mounted at the underside of the machine, to cut grasses as the machine moves across the surface being mowed.

In many typical riding mowers, the cutter deck is configured as either a ground-following deck or a floating deck. A ground-following deck typically rides on either two or four caster wheels and follows the contours of the ground. A floating deck is hung between the front and rear wheels and beneath the chassis by chains, links or other devices, being adapted to rise up when skids, wheels, rollers and the like attached to the underside of the deck make contact the lawn surface. Generally, the intent for such deck suspension system is to avoid continuing contact with the earth surface. The distance of the cutter deck from the earth surface is determined by the elevation of the chassis. When the mower crosses an earth-surface rise which is relatively severe, that is, short in horizontal length compared to the wheel base of the mower and great in height compared to the pre-set elevation of the mower deck, the deck frequently makes contact with the earth surface. Then, it is intended that the deck rises or "floats" upwardly, so the rotary blades do not hit the earth surface. Such designs work well for many kinds of unevenness, but scalping for certain earth surfaces and mower movements is still a problem. Even if there is no scalping, a variation of the height of the cutter deck relative to the earth surface is not wanted, as it varies the height of the cut grass.

Many typical prior art mowers have the wheels rigidly attached to the chassis. Thus, unevenness in the earth surface imparts a lot of up and down chassis motion. Some prior art mowers employ center-pivoting axles which somewhat reduce the vertical motion of the chassis when one wheel encounters unevenness. The related applications describe a preferred transmission steerable mower which has rear drive wheels which are independently driven and spring suspended from the chassis, and which has free pivoting caster front wheels, mounted at the outer ends of a pivotable axle or subframe. The cutter deck is suspended between the front and rear wheels.

Mowers with improved spring suspension systems reduce the amount of chassis motion when one or both drive wheels of a mower encounter unevenness in the surface being mowed. Drive wheel traction is improved. However, depending on the particulars of any non-rigid suspension system, the chassis is enabled to roll relative to the earth surface, such as, for example, when the mower is sharply turning or when the mower is traversing a steep hillside. When a mower rolls, a floating cutter deck moves closer to the earth surface and there can be a tendency for scalping of the turf by the cutter deck. An improvement in one of the related applications connects the cutter deck with the rear wheels, thereby ensuring that the cutter deck moves relative to the wheels and ground instead of relative to the chassis of the mower.

A problem still exists with the independent suspension system of the related applications. For heavier weight riders or mower accessories, such as grass catchers, the spring used in the suspension system limits the suspension. Rider discomfort occurs when the spring bottoms out. In addition, the collapsed spring can create coil bind which drastically reduces the life of the spring. Merely substituting a stiffer spring for the existing spring causes a harder ride when the load is light. A suspension that works effectively with a wide range of weight variations is therefore needed.

SUMMARY OF THE INVENTION

Briefly stated, a lawn mower includes a front wheel suspension system as well as a rear wheel suspension system. A load compensation adjuster is employed as part of the rear wheel suspension system that compensates for riders having significantly differing weights, as well as for weight changes occurring during the mowing operation, such as from grass clippings accumulating in a grass catcher bag.

According to an embodiment of the present invention, a mower includes a main frame; first and second rear wheels; and first and second rear suspension systems connecting the first and second rear wheels, respectively, to the main frame, wherein the first and second rear suspension systems each include a load compensation adjuster.

According to an embodiment of the present invention, a mower includes a main frame; first and second rear wheels; first and second rear suspension systems connecting the first and second rear wheels, respectively, to the main frame; wherein each of the first and second rear suspension systems includes a motor mount effective for mounting a motor; first and second upper links; first and second lower links; the first upper link and the first lower link pivotably connected on one end to a first vertical strut, the first vertical strut connecting an upper frame member of said main frame to a lower frame member of the main frame; the first upper link and the first lower link pivotably connected on another end to the motor mount; the second upper link and the second lower link pivotably connected on one end to a second vertical strut, the second vertical strut connecting the upper frame member to the lower frame member; the second upper link and the second lower link pivotably connected on another end to the motor mount; a spring bracket on the upper frame member between the first and second vertical struts; a rear suspension spring connected between a spring bracket and either the motor or the motor mount; and a load compensation adjuster connected inside the rear suspension spring.

DESCRIPTION OF THE PREFERRED EMBODIMENT

Figure 1:
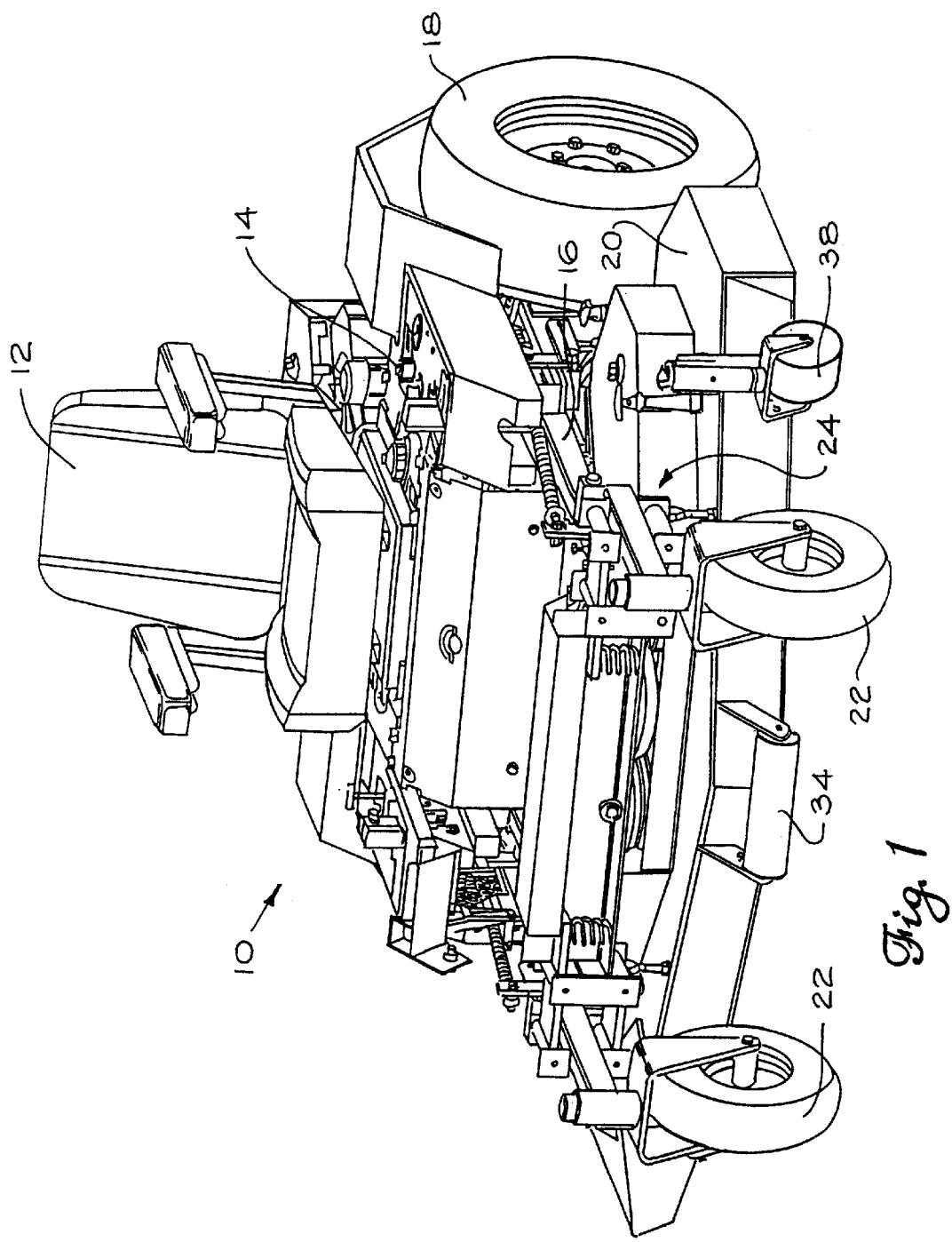
FIG. 1 shows a perspective view of a lawn mower having a front suspension system according to an embodiment of the present invention.
Figure 2:
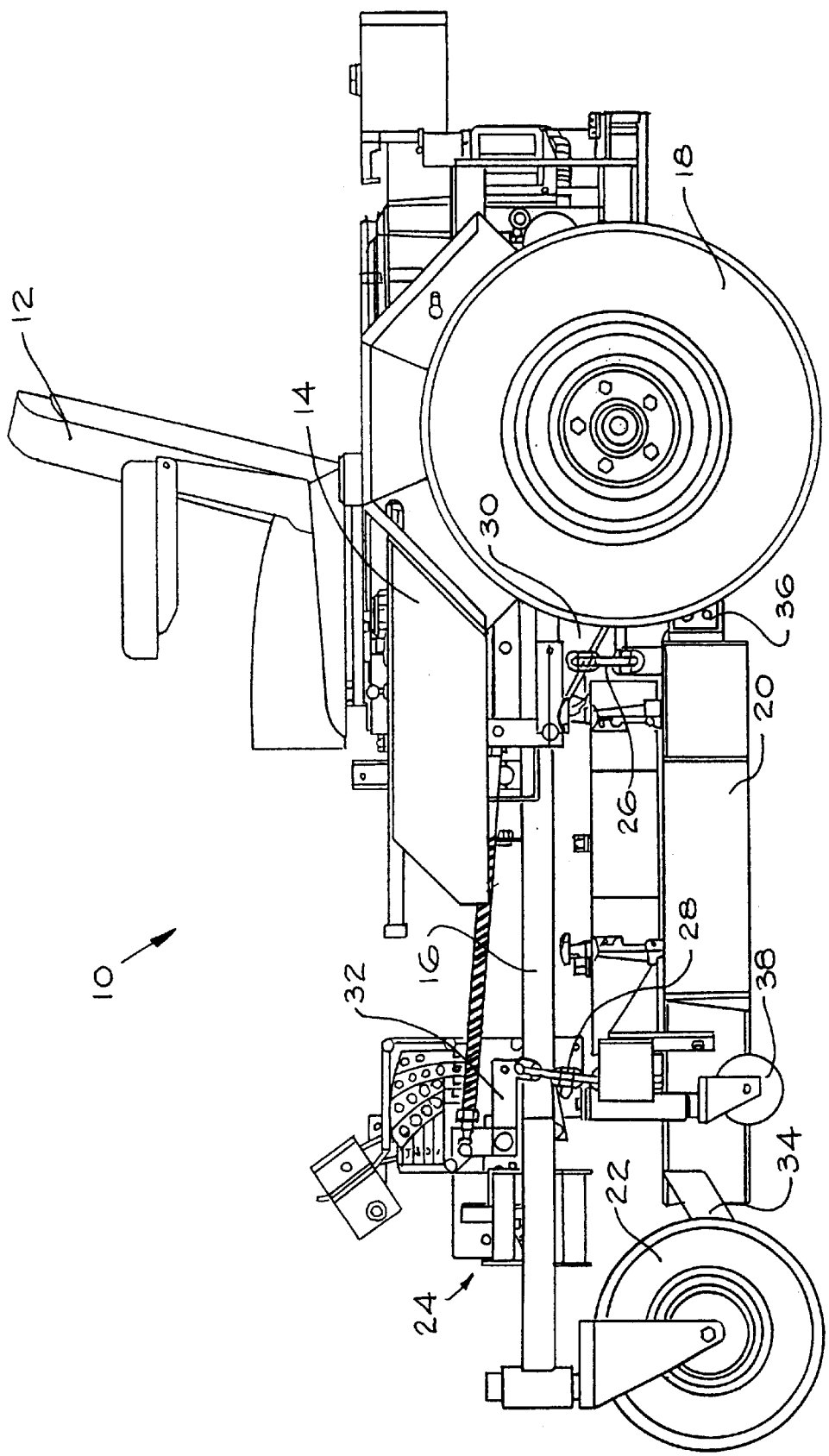
FIG. 2 shows a side elevation view of the lawn mower of FIG. 1.

Referring to FIGS. 1–2, a lawn mower 10 includes a seat 12 connected to a chassis 14. Chassis 14 in turn rests on a main frame 16. Two rear wheels 18 are connected to main frame 16 by the independent suspension (not shown) as described in co-pending U.S. patent application Ser. No. 09/119,818. Two front wheels 22 are connected to main frame 16 via a front suspension system, shown generally at 24. A floating cutter deck 20 is preferably suspended beneath main frame 16 by rear suspension chains 26 and front suspension chains 28. Each rear suspension chain 26 is preferably connected to a rear wheel bracket 30 which is "wheel-side" of the rear independent suspension system. Each front suspension chain is preferably connected to a deck height adjustment mount 32 which is part of front suspension section 24. Suspending cutter deck 20 from the "wheel-side" of the front and rear independent suspensions ensures that cutter deck 20 moves vertically up and down in response to the vertical motion of front wheels 22 and rear wheels 18, which in turn are responsive to the terrain being mowed. Scalping and uneven cuts of the grass are thus prevented.

Although the mower of the present invention can be equipped with either a ground-following cutter deck or a floating cutter deck, using a floating cutter deck with a mower having independent suspension requires additional considerations. Rolling of a lawn mower chassis is induced under certain situations. Among them are: (a) when the mower changes direction while traveling forward and centrifugal force acts laterally at the center of gravity of the machine; (b) when the mower traverses a slope and the gravitational force vector shifts direction relative to the plane of the mower wheel tread, and (c) when the mower travels over a surface undulation, lifting or lowering one or both wheels on one side, thereby rotating the mower chassis in space.

Conventional mowers typically use wheels that are rigidly connected to the chassis. In these mowers, the chassis cannot roll relative to the wheels; therefore, there is no rolling of types (a) and (b). Other conventional mowers have a pivoting front or Tear axle at one end, with an opposing end axle rigidly attached to the chassis. In these mowers, the rigidly attached axle limits the chassis roll which the pivoting axle otherwise permits to the extent the chassis is sufficiently rigid. The mower of the present invention, preferably having both front and rear independent wheel suspension systems, beneficially minimizes any rolling of the machine when a wheel passes over certain small bumps and depressions—type (c) rolling. Nonetheless, larger bumps and depressions can induce rolling.

Figure 9:
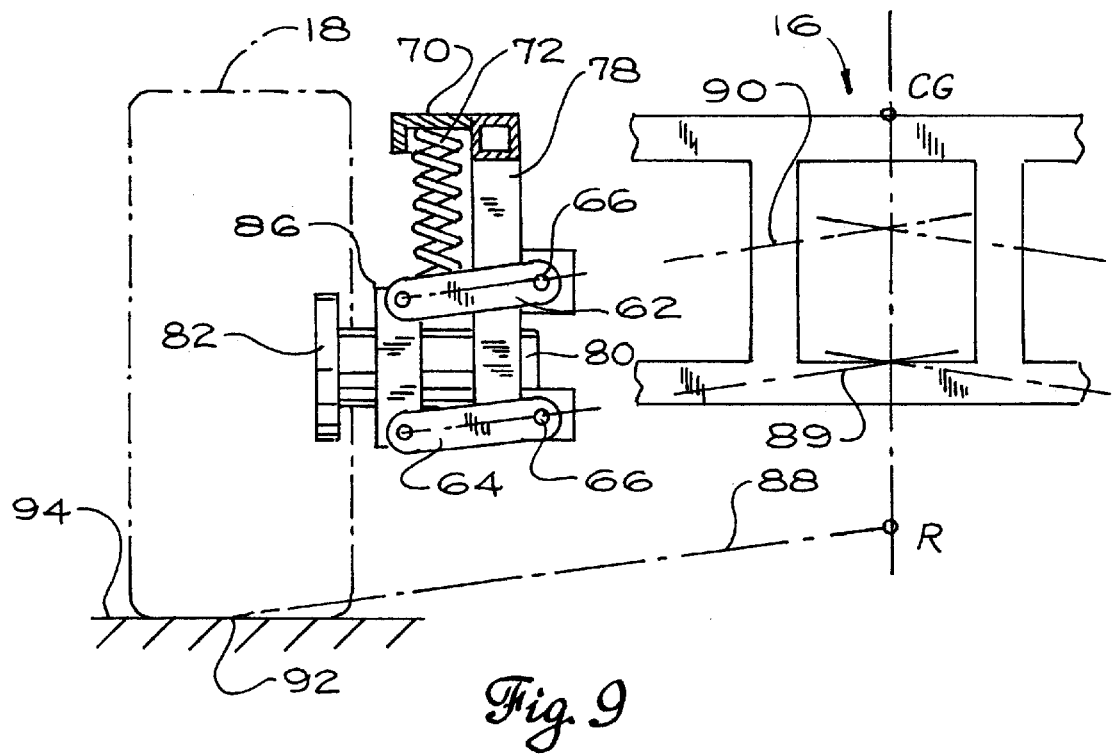
FIG. 9 shows a partial rear elevation view of a portion of the rear suspension system of FIG. 6.

As will be explained below, the suspension configuration of FIG. 9 is prone to rolling of types (a) and (b). If cutter deck 20 of mower 10 is suspended from the chassis, rolling may adversely affect the essential mower function, that is, cutting grass to an even height. In particular, when the chassis rolls and one side moves closer to the earth surface, a cutter deck suspended from the chassis also moves closer to the surface. Therefore, the preferable embodiment of the present invention couples the motion of the cutter deck to the motion of a sprung wheel rather than directly to the chassis, thereby reducing the change in cutter deck height relative to the mowed surface when the chassis rolls.

Due to the large cutting width preferred in commercial mowers and the distance between the front wheels 22, rocks or other uneven terrain features that are avoided by front wheels 22 can damage cutter deck 20. Cutter deck 20 therefore preferably includes a front roller 34, a rear roller 36 partially hidden by rear wheel 18 in FIG. 2), and front caster wheels 38 that protect cutter deck 20 from damage.

Figure 3:
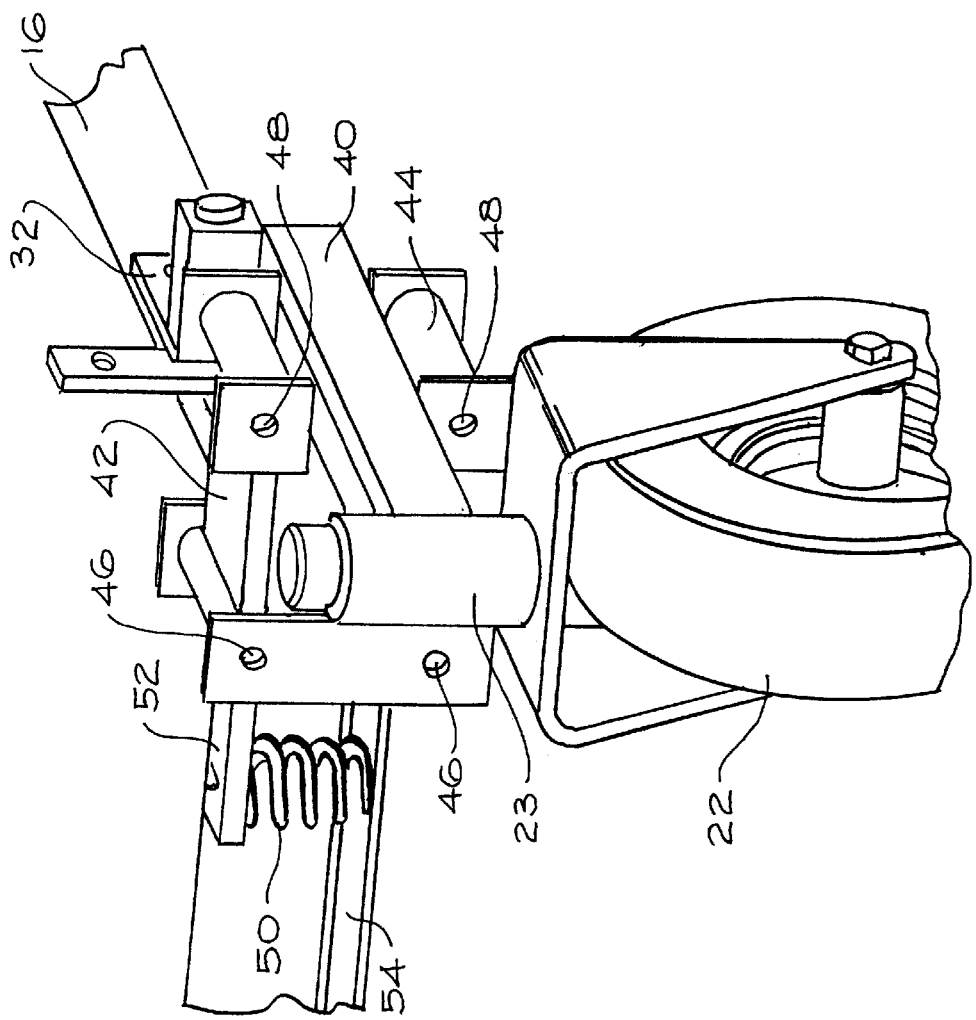
FIG. 3 shows a sectional perspective view of the front suspension system of the present invention.
Figure 4:
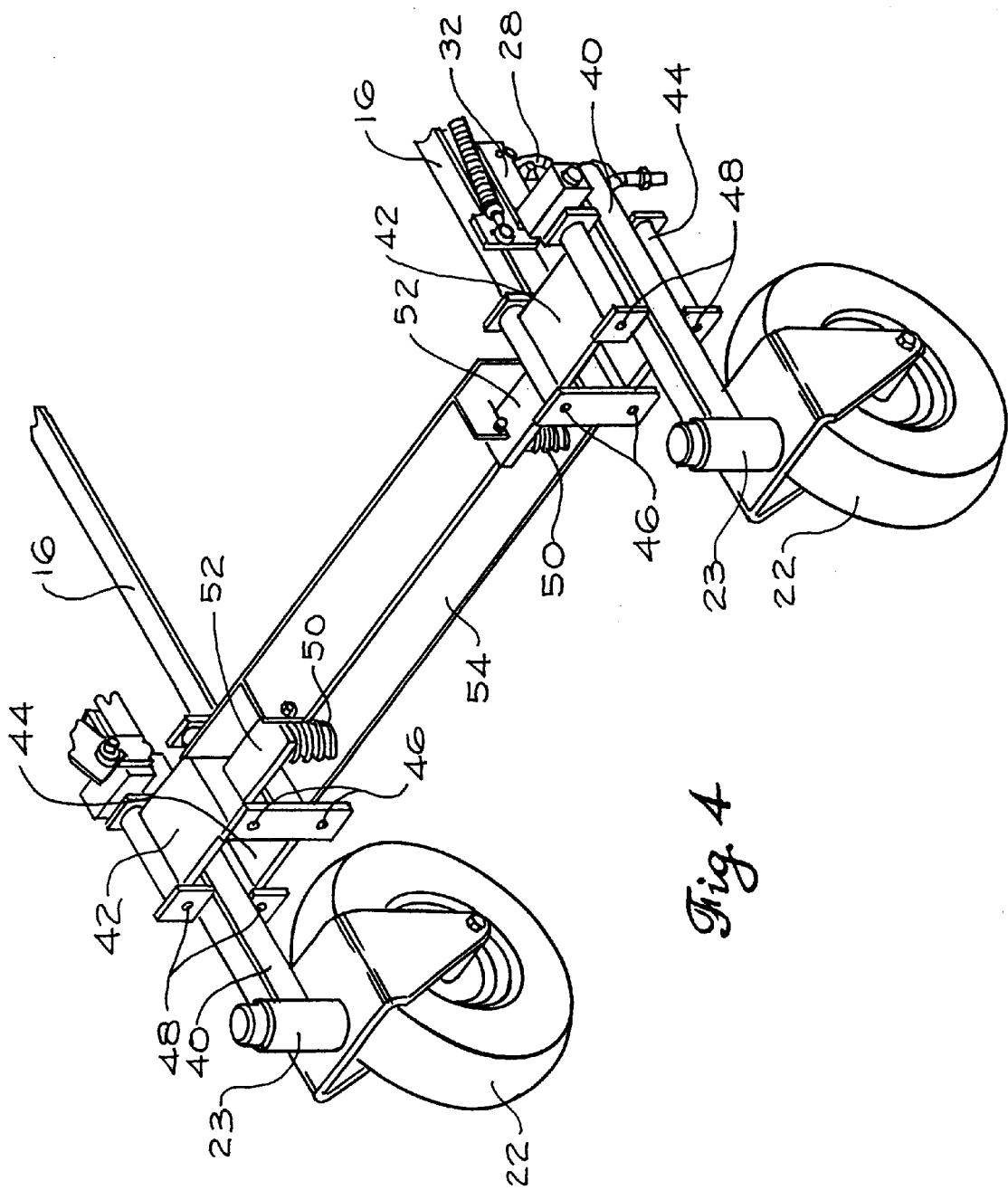
FIG. 4 shows a sectional perspective view of the front suspension system of the present invention.
Figure 5:
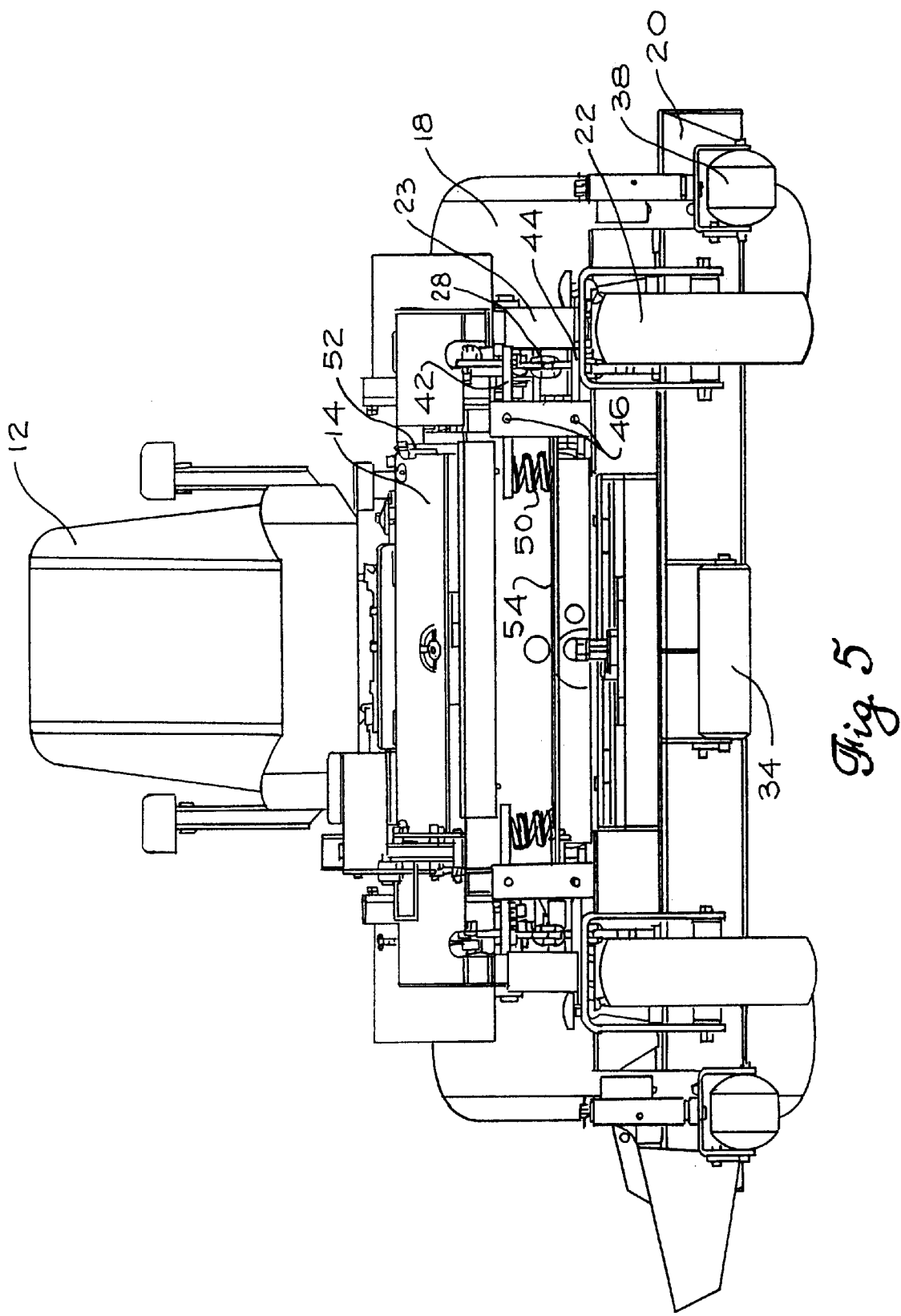
FIG. 5 shows a front elevation view of the lawn mower of FIG. 1.
Figure 6:
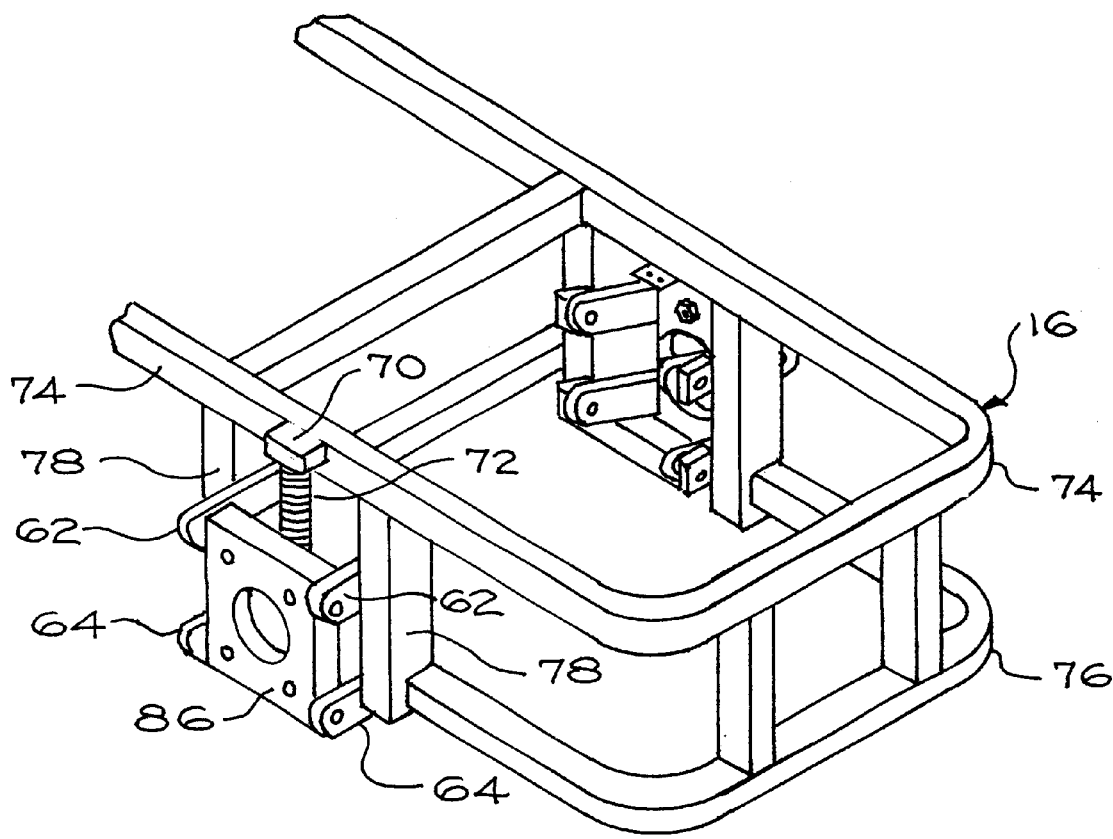
FIG. 6 shows a partial perspective view of a rear suspension system according to an embodiment of the present invention.
Figure 7:
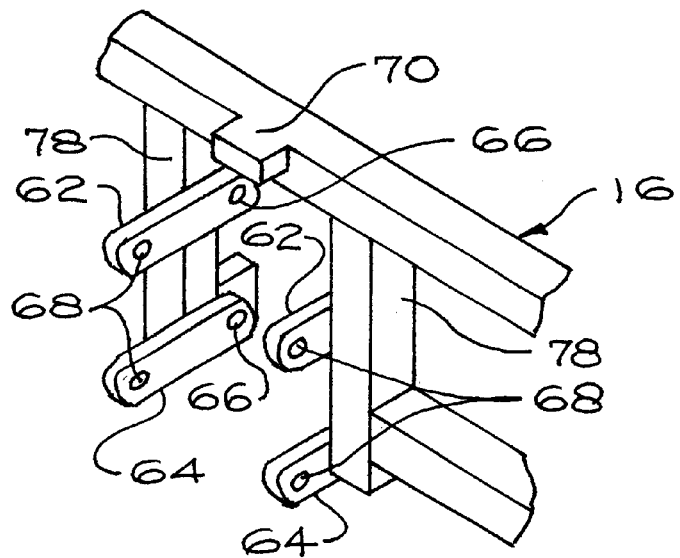
FIG. 7 shows a partial perspective view of a portion of the rear suspension system of FIG. 6.

Referring to FIGS. 3–5, front suspension system 24 includes a longitudinal suspension strut 40 that is connected to main frame 16 via an upper suspension strut 42 and a lower suspension strut 44. Front wheel 22 is connected to longitudinal strut 40 via a trunnion 39. Upper and lower suspension struts 42, 44 pivotably connect to main frame 16 at a plurality of main frame pivot points 46 and pivotably connect to longitudinal suspension strut 40 at a plurality of front suspension pivot points 48. A spring 50 is fixed between a spring bracket 52 of upper suspension strut 42 and a front transverse member 54 of main frame 16 so that upward movement of suspension system 24 compresses spring 50 between spring bracket 52 and front transverse member 54. Upper and lower suspension struts 42, 44 are preferably of equal length so that the suspension travel does not change the perpendicularity of front wheel 22 to the ground.

As front wheels 22 move vertically up and down in response to the terrain, the front of cutter deck 20, being connected to longitudinal suspension strut 40 via adjustment mount 32, moves vertically up and down in response to the vertical motion of front wheels 22. Main frame 16 is isolated from the vertical motion of front wheels 22 by front suspension system 24.

Figure 8:
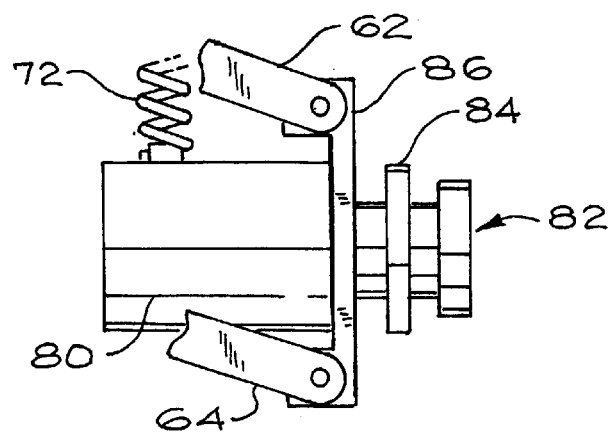
FIG. 8 shows a partial side elevation view of a portion of a rear suspension system according to an embodiment of the present invention.

Referring to FIGS. 6–9, a rear suspension system for mower 10 includes a motor mount 86 connected to main frame 16 via upper links 62 and lower links 64. Two struts 78 join an upper frame member 74 of main frame 16 to a lower frame member 76 of main frame 16. Upper and lower links 62, 64 are connected to struts 78 at main frame pivot points 66 and to motor mount 86 at rear suspension pivot points 68. Upper and lower links 62, 64 are shown in this embodiment as being of equal length. A spring 72 is captured between a spring bracket 70 of upper frame member 74 and a motor 80. FIG. 8 additionally shows an optional disk 84 on a wheel hub 82 that is used with disk brakes instead of the more conventional band-drum brakes typically used on prior art lawn mowers.

Referring specifically to FIG. 9, a roll center is an imaginary point about which a mower with movable suspension elements tends to roll when subjected to lateral forces. A roll axis of the mower runs through the front and rear roll centers. The location of a roll center R for the rear wheel suspension system is determined by examining the intersection of an upper link phantom line 90 and a lower link phantom line 89. Line 90 runs through the pivot points for upper link 62 while line 89 runs through the pivot points for lower link 64. A ground contact phantom line 88 runs from a ground contact point 92, representing the contact between rear wheel 18 and ground 94, to the intersection of lines 90 and 89. In the embodiment described above, where upper and lower links 62, 64 are of equal length, lines 90 and 89 intersect at infinity. Line 88 therefore intersects lines 90 and 89 at infinity; line 88 is thus parallel to lines 90 and 89. The intersection of line 88 with a vertical plane passing through a center of gravity (mass) of the mower is the location of roll center R.

In this embodiment, roll center R is substantially lower in elevation than the center of gravity CG of the mower. The location of roll center R can be moved vertically by changing the lengths and angles of the link assemblies. With roll center R significantly below center of gravity CG, the mower tends to sway or rock to the side when turning. Sway bars (not shown), also known as anti-sway or anti-roll bars, are optionally added to this equal-link-length suspension to inhibit swaying during turning. Such bars are typically torsion bars or other elastic structure which, when one wheel moves closer to the chassis, resist such motion with a force, the reaction to which is applied to the opposite wheel.

Notwithstanding the tendency to roll, the FIG. 9 suspension provides a better vehicle ride and absorption of bumps compared to an unequal link-length suspension. The FIG. 9 suspension also minimizes lateral motion when the mower load changes, such as when an operator mounts or dismounts the mower, removes a grass-catcher bag, or when there are changes in the mower's vertical momentum due to uneven terrain.

Figure 10:
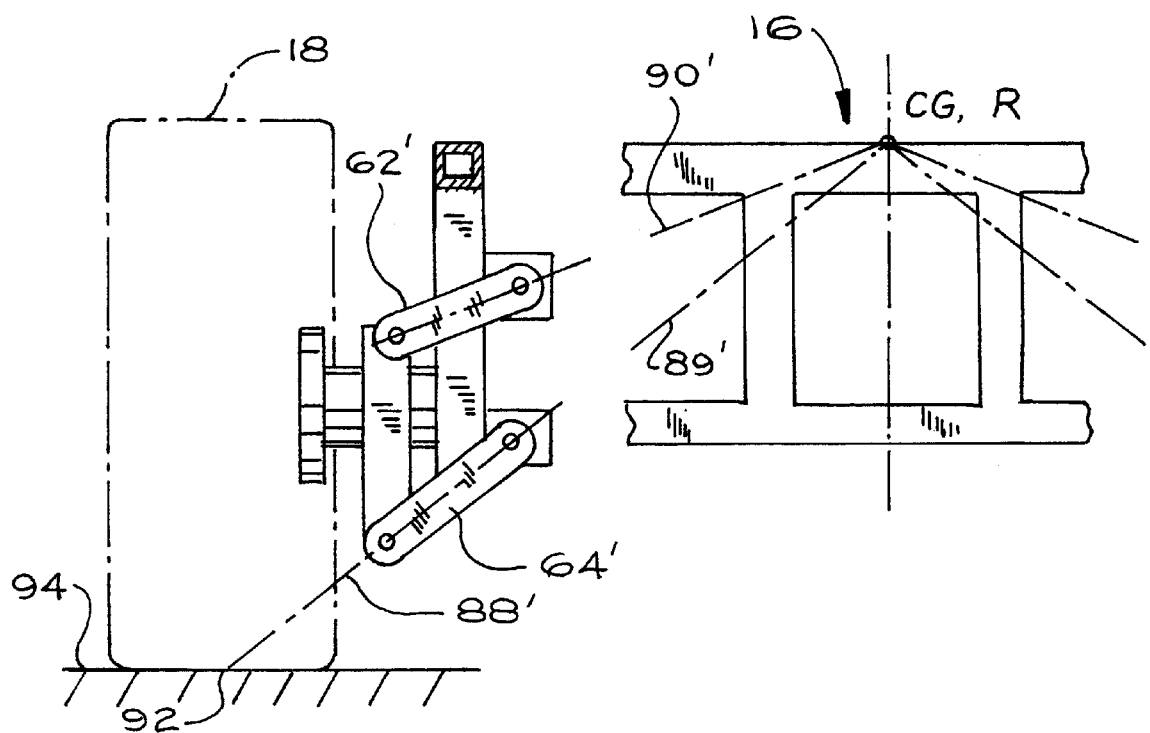
FIG. 10 shows a partial rear elevation view of a portion of a rear suspension system according to an embodiment of the present invention.

Referring to FIG. 10, an embodiment is shown with unequal link lengths. An upper link 62' is shorter than a lower link 64', with the lengths of links 62', 64' preferably determined such that the roll center R and the center of gravity CG substantially coincide. As shown in the figure, phantom lines 90' and 89' intersect at R, so ground contact line 88' intersects the vertical plane passing through the center of gravity CG at the center of gravity CG. This configuration minimizes the roll tendency of the mower during turning.

Figure 11:
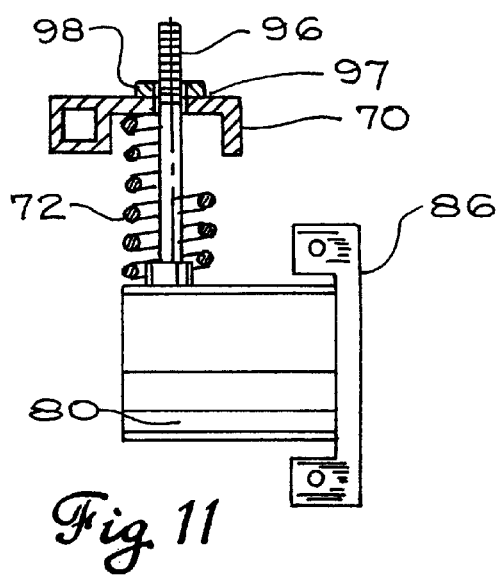
FIG. 11 shows a partial sectional view of a pre-compressed spring used a the rear suspension system according to an embodiment of the present invention.

Referring to FIG. 11, a way of pre-compressing spring 72 is shown. Pre-compression is desirable to lessen the movement of the mower chassis when the mower operator mounts and dismounts the mower. Pre-compression is preferably accomplished by pivotally attaching a threaded guide rod 96 to motor 80. Rod 96 extends through a hole 97 in spring bracket 70 with a nut 98 on the threaded end of rod 96. Nut 98 is preferably adjustable so that the amount of pre-compression can be changed when required.

Figure 12:
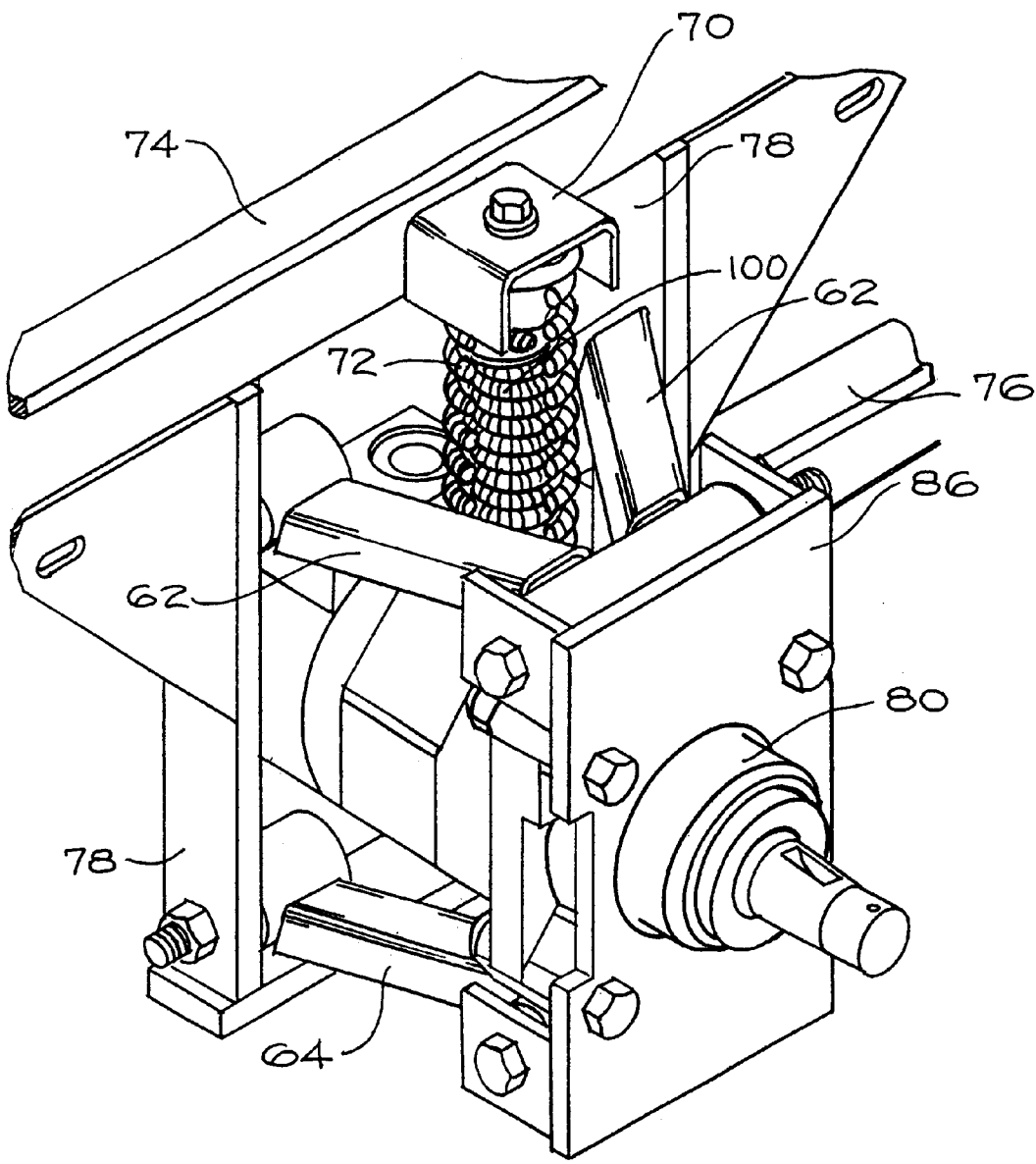
FIG. 12 shows a cutaway view of an embodiment of a load compensation adjuster according to an embodiment of the invention, wherein the load compensation adjuster is a suspension spring with an overload spring installed inside, as installed in the rear suspension system of FIGS. 6, 7, and 9.
Figure 13:
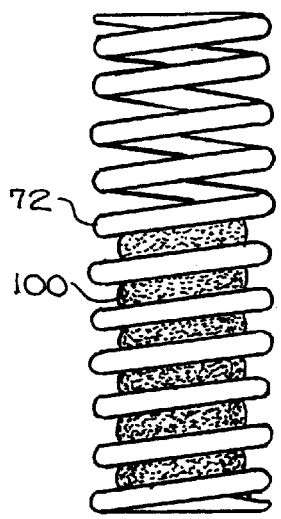
FIG. 13 shows an elevation view of the load compensation adjuster of FIG. 12.

Referring to FIGS. 12–13, a load compensation adjuster such as overload spring 100 is installed inside spring 72. If suspension spring 72 is a closed, ground end, compression spring with a right hand helix, overload spring 100 is preferably a closed, ground end, compression spring with a left-hand helix. Overload spring 100 fits inside spring 72 and is approximately one inch shorter in length than spring 72. The shorter length of overload spring 100 allows spring 72 to operate at its existing rate, but when spring 72 is compressed more than one inch, overload spring 100 begins to help carry the extra weight. Overload spring 100 is preferably wound with coils in the opposite direction from spring 72.

The characteristics of the preferred embodiment of overload spring 100 is detailed in Table 1.

TABLE 1

| Spring type | compression spring, closed and grounded end |
|---|---|
| Material | chrome silicon |
| Wire Diameter | 0.2340 in. |
| Mean Diameter | 1.0160 in. |
| Inside diameter | 0.7820 in. |
| Outside Diameter | 1.2500 in. |
| Total Coils | 15.6984 in. |
| Pitch | 0.3308 in. |
| Pitch Angle | 5.9177 deg. |
| Weight | 0.6120 lbs. |
| Free Length | 5.0000 in. |
| Solid Height | 3.6734 in. |
| Load Rate (lbs./in.) @ 0 lbs. | 5.00 in. (free length) |
| @ 150 lbs. | 4.50 in. |
| @ 300 lbs. | 4.00 in. |
| @ 398 lbs. | 3.67 in. (solid height) |

Figure 14:
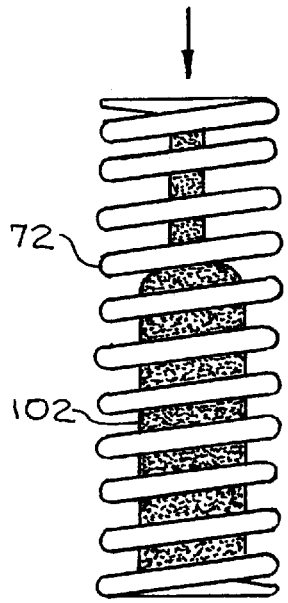
FIG. 14 shows an elevation view of a shock absorber embodiment of the load compensation adjuster of the present invention.

Referring to FIG. 14, load compensation adjustment is achieved using an alternative embodiment such as a shock absorber 102 inside spring 72 in place of overload spring 100. This arrangement is commonly referred to as a coil-over suspension.

Figure 15:
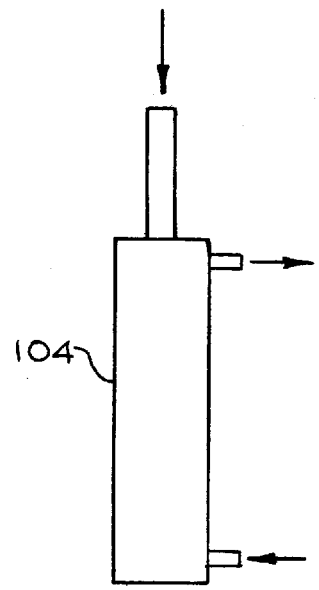
FIG. 15 shows an elevation view of an air shock embodiment of the load compensation adjuster of the present invention.

Referring to FIG. 15, load compensation adjustment is achieved using an alternative embodiment such as an air shock 104 instead of shock absorber 102, although not depicted inside spring 72 in the figure. Using air shock 104 allows adjustment of the spring tension by raising or lowering the air pressure, thereby determining the spring load or tension.

Figure 16:
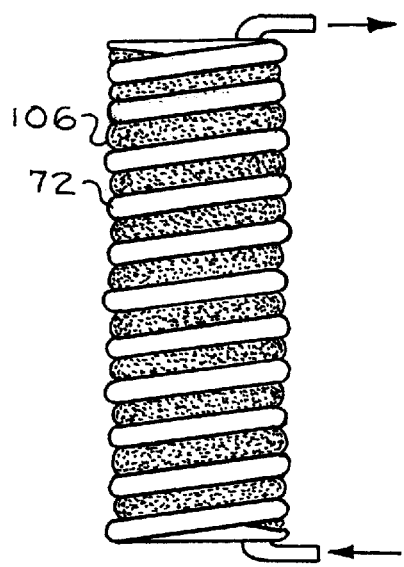
FIG. 16 shows an elevation view of an airbag embodiment of the load compensation adjuster of the present invention.

Referring to FIG. 16, load compensation adjustment is achieved by using an alternative embodiment such as an airbag 106 to replace overload spring 100 inside spring 72. Airbag 106 can be inflated or deflated for the desired suspension, either by the user of pre-inflated at the factory.

Figure 17:
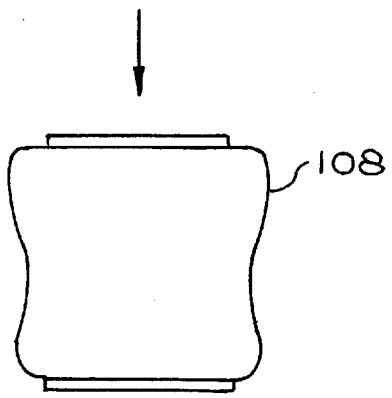
FIG. 17 shows an elevation view of an airbag embodiment of the load compensation adjuster of the present invention.

Referring to FIG. 17, an alternative embodiment for load compensation adjustment includes an airbag 108 which could replace the spring within a spring combination by acting as a variable compression spring. As the air in airbag 108 becomes compressed, the force required to compress it further increases.

Figure 18:
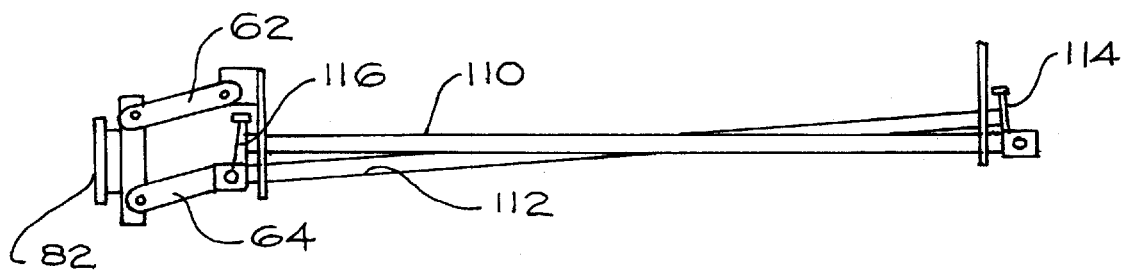
FIG. 18 shows a partial view of a front or rear suspension system according to an embodiment of the present invention.

Referring to FIG. 18, a torsion bar suspension is shown connected to wheel hub 82 at the left rear wheel location for mower 10. A first torsion bar 112 is hooked to lower link 64 at one end, while another end attaches to an adjuster 114, which permits adjustment of the tension of torsion bar 112. In similar fashion, a second torsion bar 110 is hooked to the lower link 64 on the right side of mower 10, with the other end of torsion bar 110 being attached to an adjuster 116 which is connected to lower link 64 on the left side of mower 10. The right side wheel hub and upper and lower links are not shown in FIG. 18. The torsion bars 110, 112 replace the springs 72 to provide the rear wheel suspension. Load compensation is done with adjusters 114, 116. Although the torsion suspension is shown for the rear wheels, it can be used on the front wheels as well. For the front suspension system shown in FIG. 4, front transverse member 54 and springs 50 are replaced by the torsion bars in the manner just described with respect to the rear suspension system.

Figure 19:
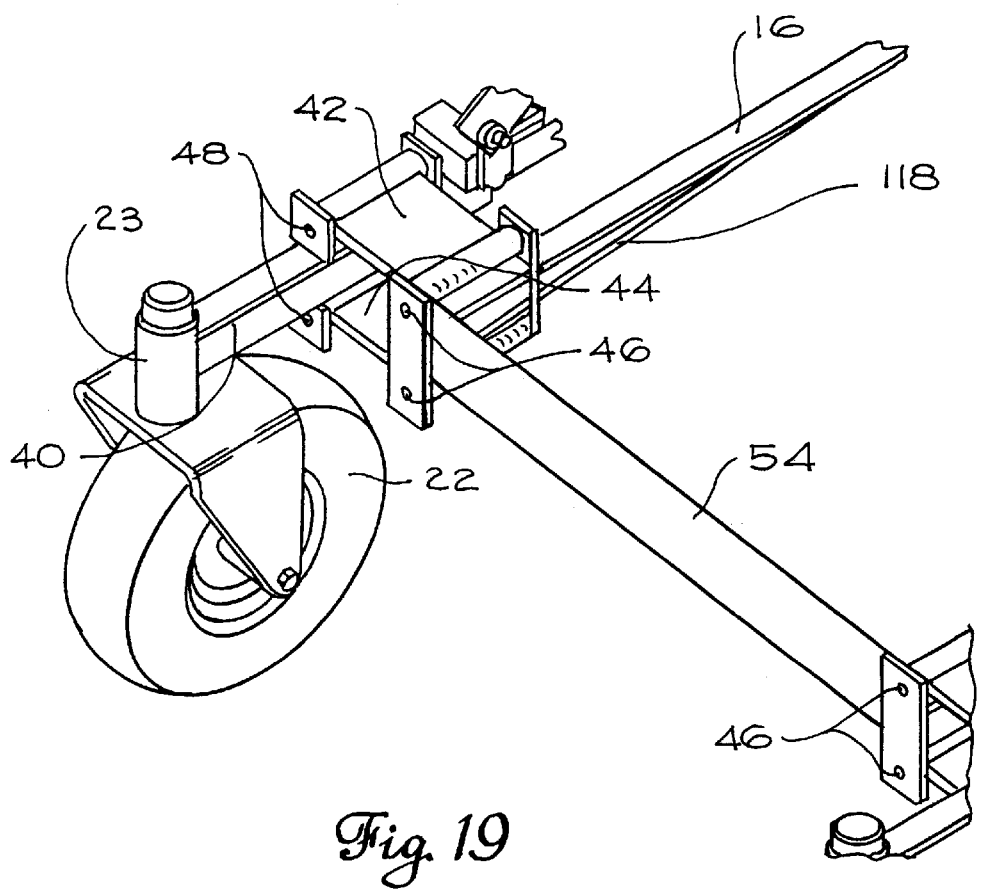
FIG. 19 shows a partial view of a front suspension system according to an embodiment of the present invention.

Referring to FIG. 19, an alternative embodiment of the front suspension system includes a torsion bar 118 attached to lower suspension strut 44 near the lower main frame pivot point 46. Torsion bar 118 is approximately 1.5 to 2.5 feet (45 to 76 cm) long and extends lengthwise to attach to main frame 16. A similar arrangement provides the front suspension for the other front wheel.

Figure 20:
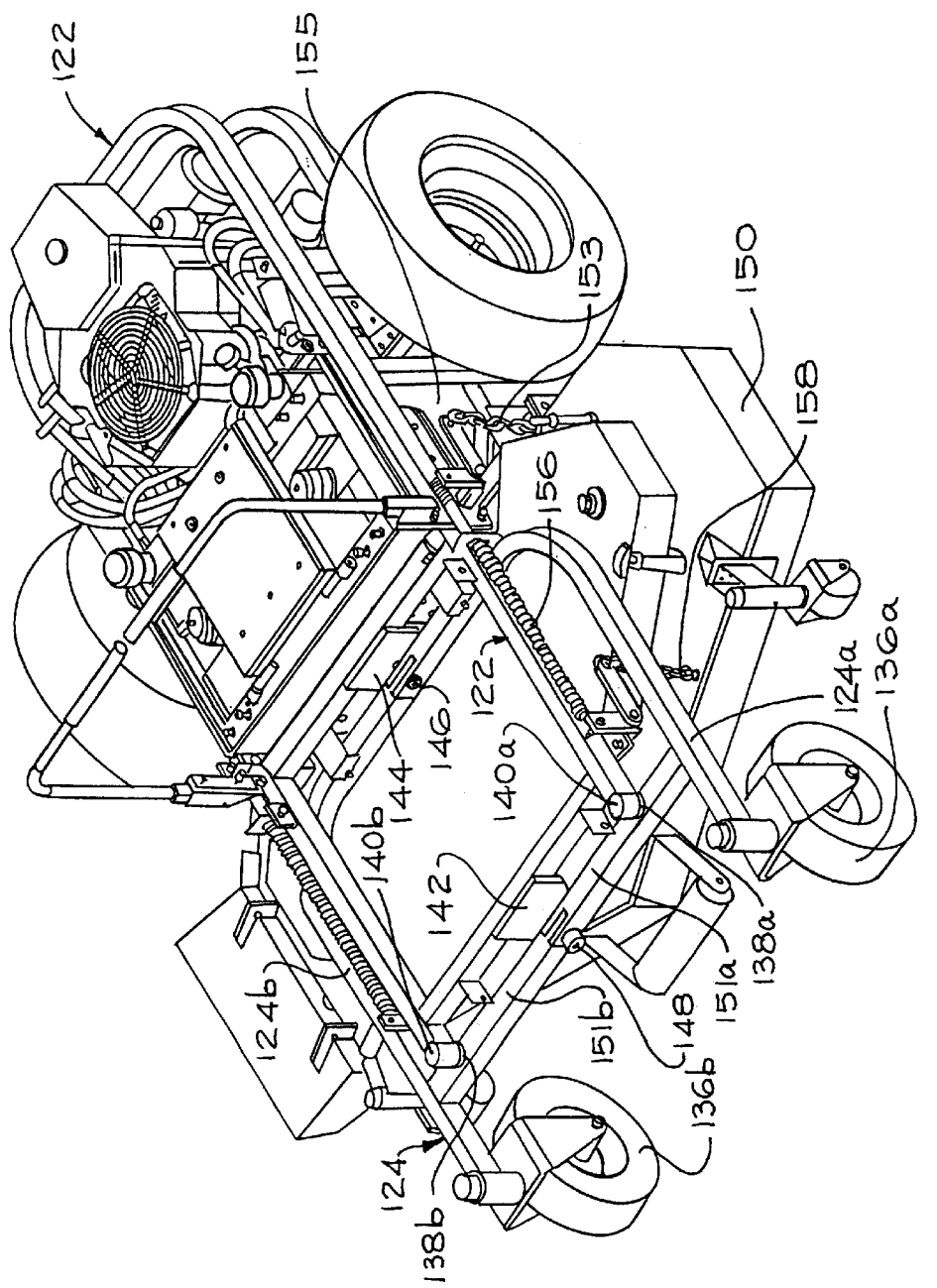
FIG. 20 shows a perspective view of a mower with an embodiment of a front suspension system according to the present invention.

Referring to FIG. 20, in another embodiment, a main frame 122 is connected to a pivoting subframe 124 that incorporates a front suspension system. Pivoting subframe 124 includes a left half subframe 124a which is hingeably connected to a right half subframe 124b. Two hinges, such as a front clevis joint 135 and a rear clevis joint 137, connect left and right half subframes 124a, 124b to each other. A front pivot pin 146 acts as the clevis pin for front clevis joint 135 while a rear pivot pin 148 acts as the clevis pin for rear clevis joint 137. Front pivot pin 146 is connected to a front transverse member 147 of main frame 122 via a front pivot plate 142, while rear pivot pin 148 is connected to a rear transverse member 149 of main frame 122 via a rear pivot plate 144.

A left spring pocket 140a, connected to an extension of main frame 122, houses a left spring 138a that abuts a front transverse portion 151a of left half subframe 124a, while a right spring pocket 140b, connected to an extension of main frame 122, houses a right spring 138b that abuts a front transverse portion 151b of right half subframe 124b. Thus, when a left caster wheel 136a rolls into a dip, left half subframe 124a moves with it, not affecting right half subframe 124b or main frame 122. Similarly, when a right caster wheel 136b rolls into a dip, right half subframe 124b moves with it, not affecting left half subframe 124a or main frame 122. Thus, three of the four mower wheels are on the ground at any given time, resulting in a stable, smooth ride with little or no scalping caused by the cutter deck.

In this embodiment, rear suspension chains 153 for a cutter deck 150 are attached to rear wheel brackets 155 via a cutter deck lift assembly 156, while front suspension chains 158 for cutter deck 150 are attached via cutter deck lift assembly 156 to main frame 122. The weight distribution in a lawn mower of this type is approximately 75% in the rear and 25% in the front. Thus, whereas the rear of the cutter deck is preferably connected to the rear wheel brackets instead of the main frame to avoid scalping during sharp turns or over rough terrain, the front of the cutter deck is preferably connected directly to the main frame in this embodiment.

Accordingly, it is to be understood that the embodiments of the invention herein described are merely illustrative of the application of the principles of the invention. Reference herein to details of the illustrated embodiments are not intended to limit the scope of the claims, which themselves recite those features regarded as essential to the invention.

What is claimed is:

1. A mower, comprising:
    a main frame;
    a cutter deck;
    at least one rotatable cutter in the cutter deck;
    first and second front wheels;
    first and second rear wheels; and
    first and second rear suspension systems connecting said first and second rear wheels, respectively, to said main frame, wherein said first and second rear suspension systems each include:
        a spring connected to the main frame; and
        a load compensation adjuster having a range of compression in which the load compensation adjuster exerts increasing reactive force against compression responsive to increasing compression of the spring;
    wherein the front and rear wheels support the main frame, cutter deck, and the at least one rotatable cutter for movement over a surface; and
    wherein each rear suspension system and rear wheel moves vertically up and down relative to the main frame, respectively against and with force exerted by the spring and load compensation adjuster, independently of movement of the other wheels.

2. A mower according to claim 1, wherein said load compensation adjuster is a shock absorber.

3. A mower according to claim 1, wherein said load compensation adjuster is an air shock.

4. A mower according to claim 1, wherein said load compensation adjuster is an airbag.

5. A mower according to claim 1, further comprising:
    first and second front suspension systems connecting said first and second front wheels, respectively, to said main frame.

6. A mower according to claim 5, further comprising:
    first and second front suspension chains connecting a front of said cutter deck to said first and second front suspension systems, respectively; and
    first and second rear suspension chains connecting a rear of said cutter deck to said first and second rear suspension systems, respectively.

7. A mower according to claim 6, wherein each of said first and second front suspension systems includes:
    a longitudinal suspension strut;

an upper suspension strut;

a lower suspension strut;

said upper and lower suspension struts pivotably connected to said longitudinal suspension strut at a plurality of front suspension pivot points and pivotably connected to main frame at a plurality of main frame pivot points;

a torsion bar attached to said lower suspension strut of one front suspension system and connected via an adjuster to the lower suspension strut of the other front suspension system; and means for connecting said longitudinal suspension strut to one of said first and second front wheels.

8. A mower according to claim 6, wherein each of said first and second front suspension systems includes:

a longitudinal suspension strut;

an upper suspension strut;

a lower suspension strut;

said upper and lower suspension struts pivotably connected to said longitudinal suspension strut at a plurality of front suspension pivot points and pivotably connected to main frame at a plurality of main frame pivot points;

a torsion bar attached to said lower suspension strut at one end of said torsion bar and another end of said torsion bar attached to said main frame at a point approximately 1.5 to 2.5 feet lengthwise from said lower suspension strut; and means for connecting said longitudinal suspension strut to one of said first and second front wheels.

9. A mower according to claim 5, further comprising:

first and second front suspension chains connecting a front of said cutter deck to said main frame; and first and second rear suspension chains connecting a rear of said cutter deck to said first and second rear suspension systems, respectively.

10. A mower according to claim 9, wherein said first and second front suspension systems include:

a pivoting subframe consisting of first and second halves;

said first and second halves being hingeably connected at front and rear pivot pins;

said front and rear pivot pins being connected to front and rear transverse members of said main frame, respectively;

said main frame having first and second forward extensions;

first and second spring pockets on said first and second forward extensions, respectively;

first and second springs in said first and second spring pockets, respectively, wherein said first and second springs are constrained at one end by said first and second spring pockets, respectively, and at another end by said first and second halves of said pivoting subframe, respectively; and first and second means for connecting said first and second halves of said pivoting subframe to said first and second front wheels, respectively.

11. A mower according to claim 1, wherein said load compensation adjuster is an overload spring.

12. A mower according to claim 1, wherein:

each spring has a respective range of compression, and each load compensation adjuster exerts a reactive force to compression in only a portion of the range of compression of the spring associated therewith.

13. A mower, comprising:

a main frame;

a cutter deck;

at least one rotatable cutter in the cutter deck;

first and second front wheels;

first and second rear wheels;

first and second rear suspension systems connecting said first and second rear wheels, respectively, to said main frame; wherein each of said first and second rear suspension systems includes a motor mount effective for mounting a motor;

first and second upper links;

first and second lower links;

said first upper link and said first lower link pivotably connected on one end to a first vertical strut, said first vertical strut connecting an upper frame member of said main frame to a lower frame member of said main frame;

said first upper link and said first lower link pivotably connected on another end to said motor mount;

said second upper link and said second lower link pivotably connected on one end to a second vertical strut, said second vertical strut connecting said upper frame member to said lower frame member;

said second upper link and said second lower link pivotably connected on another end to said motor mount;

a spring bracket on said upper frame member between said first and second vertical struts;

a rear suspension spring connected between the spring bracket and one of said motor and said motor mount; and a load compensation adjuster connected inside said rear suspension spring;

wherein the front and rear wheels support the main frame, cutter deck, and the at least one rotatable cutter for movement over a surface; and wherein each rear suspension system and rear wheel moves vertically up and down relative to the main frame, respectively against and with force exerted by the spring and load compensation adjuster, independently of movement of the other wheels.

14. A mower according to claim 13, further comprising:

first and second front suspension systems connecting said first and second front wheels, respectively, to said main frame.

15. A mower according to claim 14, wherein said first and second front suspension systems include:

a pivoting subframe consisting of first and second halves;

said first and second halves being hingeably connected at front and rear pivot pins;

said front and rear pivot pins being connected to front and rear transverse members of said main frame, respectively;

said main frame having first and second forward extensions;

first and second spring pockets on said first and second forward extensions, respectively;

first and second springs in said first and second spring pockets, respectively, wherein said first and second springs are constrained at one end by said first and second spring pockets, respectively, and at another end by said first and second halves of said pivoting subframe, respectively; and first and second means for connecting said first and second halves of said pivoting subframe to said first and second front wheels, respectively.

16. A mower according to claim 15, further comprising:

first and second front suspension chains connecting a front of said cutter deck to said main frame; and first and second rear suspension chains connecting a rear of said cutter deck to said first and second rear suspension systems, respectively.

17. A mower according to claim 14, wherein each of said first and second front suspension systems includes:

a longitudinal suspension strut;

an upper suspension strut having a first spring bracket;

a lower suspension strut;

said upper and lower suspension struts pivotably connected to said longitudinal suspension strut at a plurality of front suspension pivot points and pivotably connected to main frame at a plurality of main frame pivot points;

a front suspension spring connected between said first spring bracket and a front transverse member of said main frame; and means for connecting said longitudinal suspension strut to one of said first and second front wheels.

18. A mower according to claim 17, further comprising:

first and second front suspension chains connecting a front of said cutter deck to said first and second front suspension systems, respectively; and first and second rear suspension chains connecting a rear of said cutter deck to said first and second rear suspension systems, respectively.

19. A mower according to claim 13, wherein said load compensation adjuster is an overload spring, said overload spring being shorter than said rear suspension spring.

20. A mower according to claim 13, wherein said load compensation adjuster is a shock absorber.

21. A mower according to claim 13, wherein said load compensation adjuster is an air shock.

22. A mower according to claim 13, wherein said load compensation adjuster is an airbag.

23. A mower according to claim 13, wherein:

each rear suspension spring has a respective range of compression, and each load compensation adjuster exerts a reactive force to compression in only a portion of the range of compression of the rear suspension spring associated therewith.

* * * * *